US012810167B2

(12) United States Patent
Matsunami et al.

(10) Patent No.: US 12,810,167 B2
(45) Date of Patent: Nov. 24, 2026

(54) LEARNING SYSTEM FOR PERFORMING REINFORCEMENT LEARNING OF A COOPERATIVE ACTION BY A PLURALITY OF AGENTS, LEARNING METHOD, AND LEARNING PROGRAM

(71) Applicants: MITSUBISHI HEAVY INDUSTRIES, LTD., Tokyo (JP); NAGOYA INSTITUTE OF TECHNOLOGY, Aichi (JP)

(72) Inventors: Natsuki Matsunami, Tokyo (JP); Takayuki Ito, Aichi (JP); Jin Tanda, Aichi (JP)

(73) Assignees: MITSUBISHI HEAVY INDUSTRIES, LTD., Tokyo (JP); NAGOYA INSTITUTE OF TECHNOLOGY, Aichi (JP)

( * ) Notice: Subject to any disclaimer, the term of this patent is extended or adjusted under 35 U.S.C. 154(b) by 1005 days.

(21) Appl. No.: 17/798,141

(22) PCT Filed: Feb. 2, 2021

(86) PCT No.: PCT/JP2021/003781
§ 371 (c)(1),
(2) Date: Aug. 8, 2022

(87) PCT Pub. No.: WO2021/157577
PCT Pub. Date: Aug. 12, 2021

(65) Prior Publication Data

US 2023/0071293 A1 Mar. 9, 2023

(30) Foreign Application Priority Data

Feb. 7, 2020 (JP) ................................ 2020-019844

(51) Int. Cl.
*G06N 3/092* (2023.01)
*G06N 20/00* (2019.01)
(Continued)

(52) U.S. Cl.
CPC ............ *G06N 3/092* (2023.01); *G06N 20/00* (2019.01); *G05B 2219/32334* (2013.01);
(Continued)

(58) Field of Classification Search
CPC ........ G06N 3/092; G06N 20/00; G06N 20/20; G06N 3/006; G05B 2219/34082; G05B 2219/40499; G05B 2219/32334
See application file for complete search history.

(56) References Cited

U.S. PATENT DOCUMENTS 11,243,532 B1 * 2/2022 Levihn ................ G05D 1/0291
2018/0165603 A1 * 6/2018 Van Seijen ........... G06N 3/096
(Continued)

FOREIGN PATENT DOCUMENTS

JP 2019-19040 2/2019

OTHER PUBLICATIONS

Moissinac, Béatrice, "Reinforcement Learning-based Off-Equilibrium Incentives to Approximate the VCG Mechanism" Jan. 17, 2014, pp. i-58. (Year: 2014).*
(Continued)

*Primary Examiner* — Chase P. Hinckley
(74) *Attorney, Agent, or Firm* — Wenderoth, Lind & Ponack, L.L.P.

(57) ABSTRACT

A learning system for performing reinforcement learning of a cooperative action by agents includes the agents; and a reward granting unit configured to grant a reward. The reward granting unit performs a step of, in the presence of a target agent to which the reward is to be granted, calculating an evaluation value relating to a cooperative action of
(Continued)

other agents as a first evaluation value; a step of, in the absence of the target agent, calculating an evaluation value relating to a cooperative action of the other agents as a second evaluation value; and a step of calculating a difference between the first and second evaluation values as a penalty of the target agent and calculating the reward to be granted to the target agent based on the penalty. The target agent performs learning of the decision-making model based on the reward granted.

3 Claims, 4 Drawing Sheets

(51) Int. Cl.
*G06N 3/006* (2023.01)
*G06N 20/20* (2019.01)

(52) U.S. Cl.
CPC .............. *G05B 2219/34082* (2013.01); *G05B 2219/40499* (2013.01); *G06N 3/006* (2013.01); *G06N 20/20* (2019.01)

(56) References Cited

U.S. PATENT DOCUMENTS

| | | | | |
|---|---|---|---|---|
| 2019/0266489 | A1* | 8/2019 | Hu | B60W 10/20 |
| 2019/0370649 | A1* | 12/2019 | Burhani | G06N 3/08 |
| 2020/0062262 | A1* | 2/2020 | Kusari | G08G 1/164 |
| 2020/0244707 | A1* | 7/2020 | Silver | G06N 3/045 |
| 2020/0250486 | A1* | 8/2020 | Kim | G01C 21/3484 |
| 2020/0279136 | A1* | 9/2020 | Subramanian | G06N 20/20 |
| 2021/0143639 | A1* | 5/2021 | Duan | H02J 3/12 |
| 2021/0232913 | A1* | 7/2021 | Martin | G06N 3/088 |
| 2023/0071293 | A1* | 3/2023 | Matsunami | G06N 20/00 |
| 2023/0083842 | A1* | 3/2023 | Kojima | G06N 20/00 706/12 |

OTHER PUBLICATIONS

Yu et al., "Collective Learning for the Emergence of Social Norms in Networks Multiagent Systems" Nov. 13, 2014, pp. 2342-2355. (Year: 2014).*
Wang et al., "Shapley Q-value: A Local Reward Approach to Solve Global Reward Games" Nov. 25, 2019, arXiv: 1907.05707v4, pp. 1-14. (Year: 2019).*
Matsunami et al., "Reward Design for Multi-Agent Reinforcement Learning with a Penalty Based on the Payment Mechanism" 2021, pp. 1-11. (Year: 2021).*
Matsunami et al., "Agents that Learn to Vote for a Joint Action Through Multi-Agent Reinforcement Learning" 2020, pp. 832-833. (Year: 2020).*
Juliani et al., "Unity: A General Platform for Intelligent Agents" Sep. 7, 2018, arXiv: 1809.02627v1, pp. 1-18. (Year: 2018).*
Wu et al., "A Multi-Agent Reinforcement Learning Method for Impression Allocation in Online Display Advertising" Sep. 10, 2018, arXiv: 1809.03152v1, pp. 1-8. (Year: 2018).*
Xu et al., "Voting-Based Multi-Agent Reinforcement Learning" Jul. 2, 2019, arXiv: 1907.01385v1, pp. 1-13. (Year: 2019).*
Devlin et al., "Potential-Based Difference Rewards for Multiagent Reinforcement Learning" May 2014, pp. 165-172. (Year: 2014).*
Lau et al., "Weighted Voting Game based Algorithm for Joining a Microscopic Coalition" Oct. 2013, pp. i-5. (Year: 2013).*
Rohbogner et al., "Vickrey-Clarke-Grove based Multi Agent Energy Management System" May 2015, pp. 1-10. (Year: 2015).*
Xiao et al., "FRESH: Interactive Reward Shaping in High-Dimensional State Spaces using Human Feedback" Jan. 19, 2020, arXiv: 2001.06781, pp. 1-9. (Year: 2020).*
Kwon et Kim, "Multi-Agent Deep Reinforcement Learning for Cooperative Connected Vehicles" Jan. 8, 2020, arXiv: 2001.02337, pp. 1-6. (Year: 2020).*
Huang et al., "Learning to Drive via Apprenticeship Learning and Deep Reinforcement Learning" Jan. 12, 2020, arXiv: 2001.03864, pp. 1-7. (Year: 2020).*
Scheible, Dominik, "Response to the Communication pursuant to Rules 70(2) and 70a(2) EPC" Jun. 16, 2023, EP4086823A4, Amendments received before examination, pp. 1-4. (Year: 2023).*
Chen et al., "Multi-Tenant Cross-Silo Resource Orchestration: A Deep Reinforcement Learning Approach" Jun. 3, 2019, arXiv: 1807.09350v2, pp. 1-16. (Year: 2019).*
Extended European Search Report issued May 30, 2023 in corresponding European Patent Application No. 21750635.1.
Yong Liu et al., "Multi-Agent Game Abstraction via Graph Attention Neural Network", arxiv.org, Cornell University Library, 201 Olin Library Cornell University Ithaca, NY 14853, Nov. 25, 2019 (Nov. 25, 2019), XP081538845, Section 3-4; p. 3-p. 7.
Anahita Mohseni-Kabir et al., "Interaction-Aware Multi-Agent Reinforcement Learning for Mobile Agents with Individual Goals", 2019 International Conference on Robotics and Automation (ICRA), IEEE, May 20, 2019 (May 20, 2019), pp. 3370-3376, XP033593677, DOI: 10.1109/ICRA.2019.8793721 [retrieved on Aug. 9, 2019] Sections III-IV; pp. 3271-3275.
Sergios Karagiannakos, "The idea behind Actor-Critics and how A2C and A3C improve them", AI Summer, Nov. 17, 2018 (Nov. 17, 2018), XP093047985, Retrieved from the Internet: URL:https://theaisummer.com/Actor_critics/ [retrieved on May 18, 2023].
Thomas Simonini, "An intro to Advantage Actor Critic methods: let's play Sonic the Hedgehog!", Jul. 26, 2018 (Jul. 26, 2018), XP093047986, Retrieved from the Internet: URL:https://www.freecodecamp.org/news/an-intro-to-advantage-actor-critic-methods-lets-play-sonic-the-hedgehog-86d6240171d/ [retrieved on May 18, 2023].
International Search Report issued Apr. 27, 2021 in International (PCT) Application No. PCT/JP2021/003781.
Office Action issued Jul. 27, 2026 in corresponding European Patent Application No. 21750635.1, 15 pages.
Kleanthis Malialis et al., "Resource Abstraction for Reinforcement Learning in Multiagent Congestion Problems", arXiv.org, Mar. 1, 2019, XP093411129, Retrieved from the Internet: URL:https://arxiv.org/pdf/1903.05431, 9 pages.
Yue Xu et al., "Voting-Based Multi-Agent Reinforcement Learning for Intelligent IoT", arXiv.org, Aug. 1, 2020, XP093411130, Retrieved from the Internet: URL:https://arxiv.org/pdf/1907.01385, 13 pages.

* cited by examiner

LEARNING SYSTEM FOR PERFORMING REINFORCEMENT LEARNING OF A COOPERATIVE ACTION BY A PLURALITY OF AGENTS, LEARNING METHOD, AND LEARNING PROGRAM

FIELD

The present disclosure relates to a learning system, a learning method, and a learning program for multi agents.

BACKGROUND

In the field of multi-agent reinforcement learning, a device for appropriately distributing a reward to each agent is known (see, for example, Patent Literature 1). Based on the reward a target agent has obtained by using respective pieces of information given by information supply agents, the device estimates virtual revenue that might be obtained using the respective pieces of information from the information supply agents, and, based on the estimated virtual revenue, assesses the price of the information given by the information supply agents.

CITATION LIST

Patent Literature

Patent Literature 1: Japanese Patent Application Laid-open No. 2019-19040

SUMMARY

Technical Problem

In a multi-agent system, a cooperative action is performed by a plurality of agents. In multi-agent reinforcement learning, each agent performs learning to maximize its own reward. However, depending on the conditions of reward distribution to each agent, each agent may perform an action to maximize the own reward, which sometimes interferes with learning relating to cooperative action.

It is therefore an object of this disclosure to provide a learning system, a learning method, and a learning program capable of granting a reward that allows a cooperative action by a plurality of agents to be appropriately learned.

Solution to Problem

A learning system according to the present disclosure is for performing reinforcement learning of a cooperative action by a plurality of agents under a multi-agent system in which the plurality of agents perform the cooperative action. The learning system includes the plurality of agents; and a reward granting unit configured to grant a reward to the plurality of agents. Each of the agents includes a state acquisition unit configured to acquire a state of the agent; a reward acquisition unit configured to acquire the reward from the reward granting unit; a processing unit configured to select an action based on the state and the reward by using a decision-making model for selecting the action; and an execution unit configured to execute the action selected by the processing unit. The reward granting unit performs a first step of, in the presence of a target agent to which the reward is to be granted, calculating an evaluation value relating to a cooperative action of other agents as a first evaluation value; a second step of, in the absence of the target agent, calculating an evaluation value relating to a cooperative action of the other agents as a second evaluation value; and a third step of calculating a difference between the first evaluation value and the second evaluation value as a penalty of the target agent and calculating the reward to be granted to the target agent based on the penalty. The target agent performs learning of the decision-making model based on the reward granted from the reward granting unit.

Another learning system according to the present disclosure is for performing reinforcement learning of a cooperative action by a plurality of agents under a multi-agent system in which the plurality of agents perform the cooperative action. The learning system includes the plurality of agents; and a reward granting unit configured to grant a reward to the plurality of agents. Each of the agents includes a state acquisition unit configured to acquire a state of the agent; a reward acquisition unit configured to acquire the reward from the reward granting unit; a processing unit configured to select an action based on the state and the reward by using a decision-making model for selecting the action; and an execution unit configured to execute the action selected by the processing unit. The reward granting unit performs a fourth step of causing the plurality of agents to perform weighted voting relating to whether to perform a cooperative action; and a fifth step of, when a result of voting obtained in the absence of the target agent overturns a result of voting in the presence of the target agent, reducing a reward to be granted to the target agent by an amount of reward determined based on the result of voting in the absence of the target agent. The target agent performs learning of the decision-making model based on the reward granted from the reward granting unit.

A learning method for performing reinforcement learning of a cooperative action by a plurality of agents under a multi-agent system in which the plurality of agents perform the cooperative action. Each of the agents includes a state acquisition unit configured to acquire a state of the agent; a reward acquisition unit configured to acquire a reward from a reward granting unit configured to grant the reward; a processing unit configured to select an action based on the state and the reward by using a decision-making model for selecting the action; and an execution unit configured to execute the action selected by the processing unit. The learning method includes a first step of, in the presence of a target agent to which the reward is to be granted, calculating an evaluation value relating to a cooperative action of other agents as a first evaluation value; a second step of, in the absence of the target agent, calculating an evaluation value relating to a cooperative action of the other agents as a second evaluation value; a third step of calculating a difference between the first evaluation value and the second evaluation value as a penalty of the target agent and calculating the reward to be granted to the target agent based on the penalty; and a step of performing learning of the decision-making model of the target agent based on the reward granted from the reward granting unit.

Another learning method according to the present disclosure is for performing reinforcement learning of a cooperative action by a plurality of agents under a multi-agent system in which the plurality of agents perform the cooperative action. Each of the agents includes a state acquisition unit configured to acquire a state of the agent; a reward acquisition unit configured to acquire a reward from a reward granting unit configured to grant the reward; a processing unit configured to select an action based on the state and the reward by using a decision-making model for selecting the action; and an execution unit configured to execute the action selected by the processing unit. The learning method includes a fourth step of causing the plurality of agents to perform weighted voting relating to whether to perform a cooperative action; a fifth step of, when a result of voting obtained in the absence of the target agent overturns a result of voting in the presence of the target agent, reducing a reward to be granted to the target agent by an amount of reward determined based on the result of voting in the absence of the target agent; and a step of performing learning of the decision-making model of the target agent based on the reward granted from the reward granting unit.

A learning program according to the present disclosure is for performing reinforcement learning of a cooperative action by a plurality of agents under a multi-agent system in which the plurality of agents perform the cooperative action. Each of the agents includes a state acquisition unit configured to acquire a state of the agent; a reward acquisition unit configured to acquire a reward from a reward granting unit configured to grant the reward; a processing unit configured to select an action based on the state and the reward by using a decision-making model for selecting the action; and an execution unit configured to execute the action selected by the processing unit. The learning program causes the reward acquisition unit to perform: a first step of, in the presence of a target agent to which the reward is to be granted, calculating an evaluation value relating to a cooperative action of other agents as a first evaluation value; a second step of, in the absence of the target agent, calculating an evaluation value relating to a cooperative action of the other agents as a second evaluation value; and a third step of calculating a difference between the first evaluation value and the second evaluation value as a penalty of the target agent and calculating the reward to be granted to the target agent based on the penalty. The learning program causes the target agent to perform learning of the decision-making model of the target agent based on the reward granted from the reward granting unit.

Another learning program according to the present disclosure is for performing reinforcement learning of a cooperative action by a plurality of agents under a multi-agent system in which the plurality of agents perform the cooperative action. Each of the agents includes a state acquisition unit configured to acquire a state of the agent; a reward acquisition unit configured to acquire a reward from a reward granting unit configured to grant the reward; a processing unit configured to select an action based on the state and the reward by using a decision-making model for selecting the action; and an execution unit configured to execute the action selected by the processing unit. The learning program causes the reward acquisition unit to execute: a fourth step of causing the plurality of agents to perform weighted voting relating to whether to perform a cooperative action; and a fifth step of, when a result of voting obtained in the absence of the target agent overturns a result of voting in the presence of the target agent, reducing a reward to be granted to the target agent by an amount of reward determined based on the result of voting in the absence of the target agent. The learning program causes the target agent to perform learning of the decision-making model of the target agent based on the reward granted from the reward granting unit.

Advantageous Effects of Invention

According to this disclosure, a reward allowing appropriate learning of a cooperative action by a plurality of agents can be granted.

DESCRIPTION OF EMBODIMENTS

Embodiments according to the present invention will now be described in detail with reference to the drawings. It should be noted that the embodiments are not intended to limit this invention. The components of the embodiments include those that could be easily replaced by the skilled person or those that are substantially the same. The components described below can be combined as appropriate. In the case of having a plurality of embodiments, the embodiments are allowed to be combined with one another.

First Embodiment

A learning system 1 according to a first embodiment is a system that performs reinforcement learning of a plurality of agents 5, namely, multi-agents, that performs a cooperative action. Examples of the agent 5 may include a moving body, such as a vehicle, ship, and aircraft.

Figure 1:
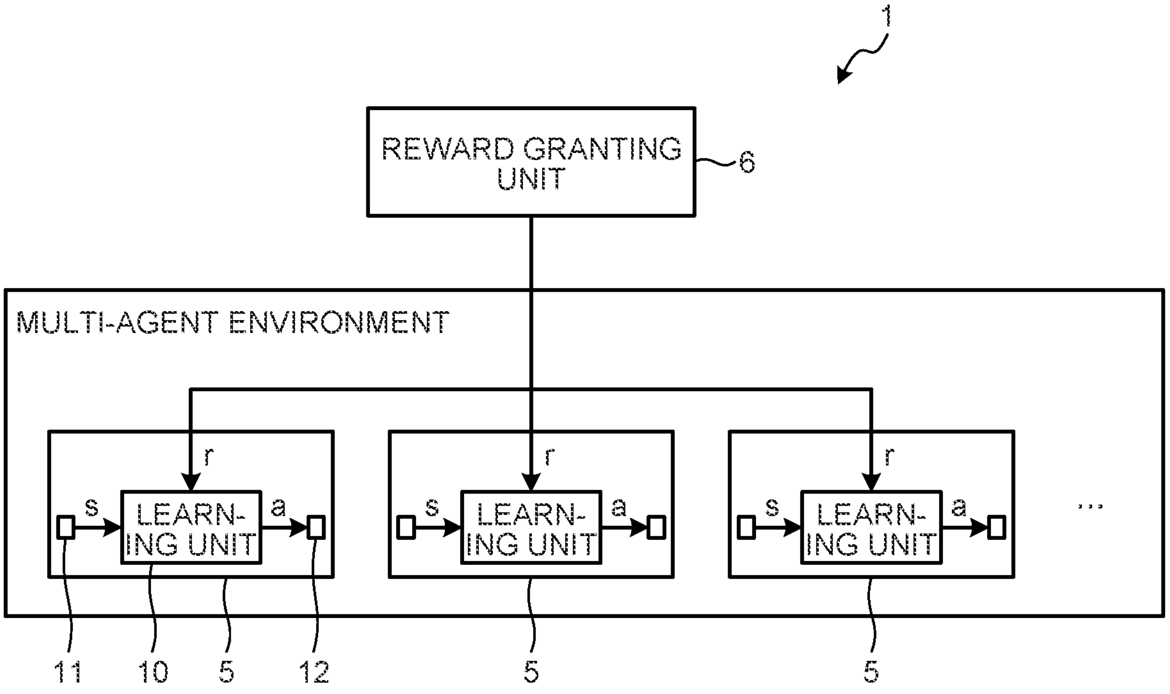
FIG. 1 is a drawing that schematically illustrates a learning system according to a first embodiment.
Figure 2:
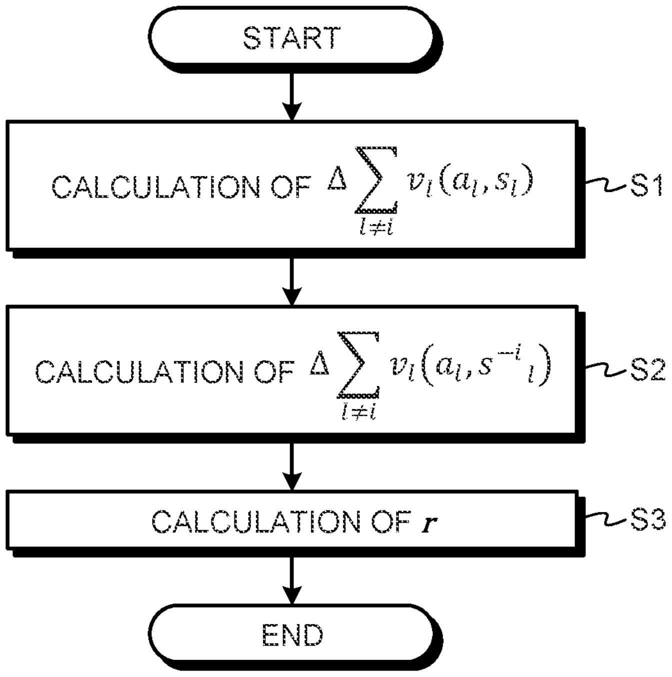
FIG. 2 is a flowchart relating to calculation of a reward by the learning system according to the first embodiment.
Figure 3:
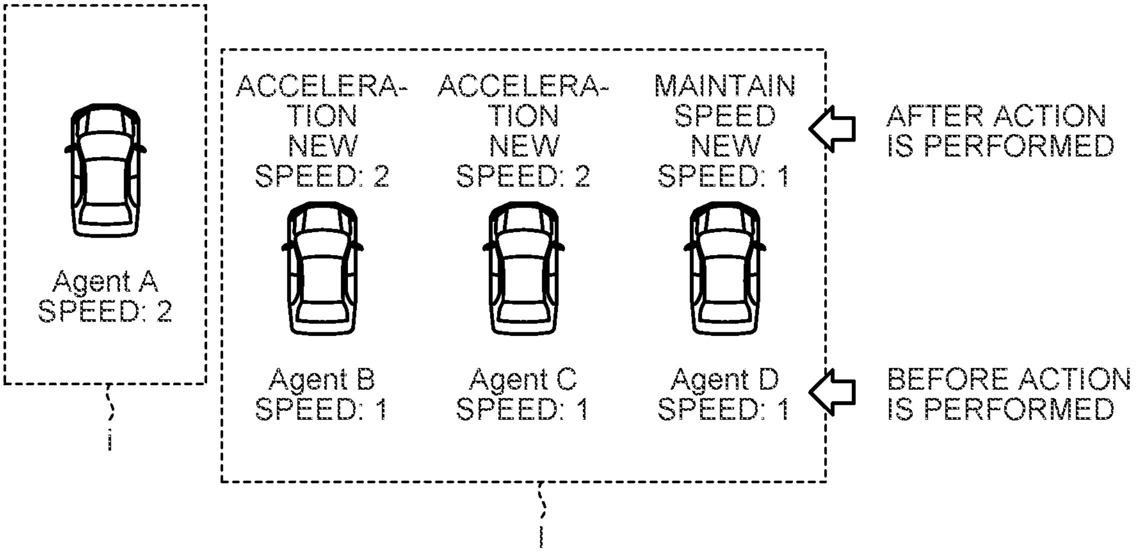
FIG. 3 is an illustrative drawing relating to learning of the learning system according to the first embodiment.
Figure 4:
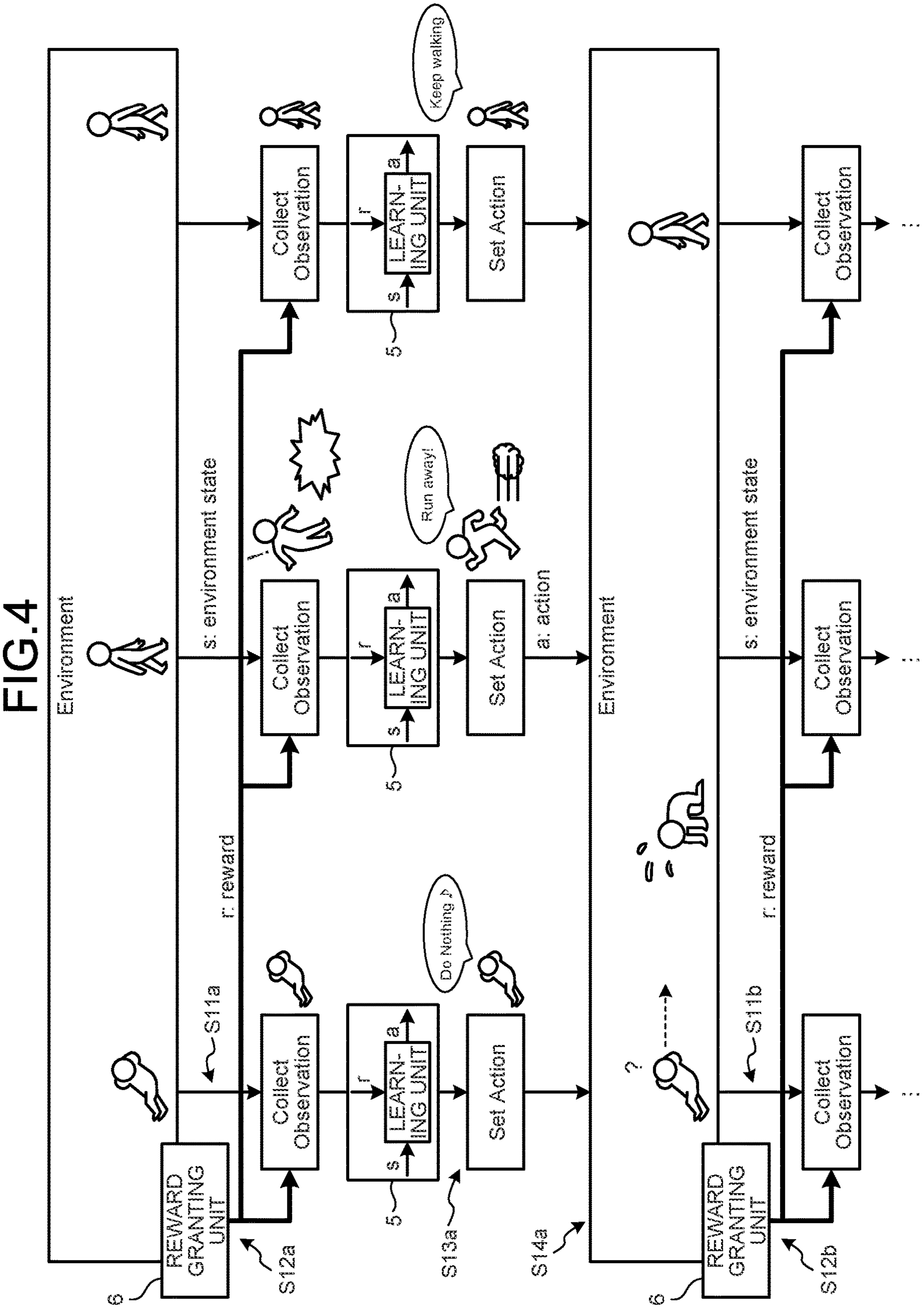
FIG. 4 is a flowchart that illustrates a learning method according to the first embodiment.

FIG. 1 is a drawing that schematically illustrates a learning system according to the first embodiment. FIG. 2 is a flowchart relating to calculation of a reward by the learning system according to the first embodiment. FIG. 3 is an illustrative drawing relating to learning of the learning system according to the first embodiment. FIG. 4 is a flowchart that illustrates a learning method according to the first embodiment.

Learning System

The learning system 1 is implemented by, for example, a computer, and performs reinforcement learning of the agents 5 in a multi-agent environment (Environment), existing as a virtual space. As illustrated in FIG. 1, the learning system 1 has the agents 5 and a reward granting unit 6 that grants a reward to the agents 5. The agents 5 and the reward granting unit 6 operate on a computer. In the learning system 1, each agent 5 performs reward-based learning with the reward granting unit 6 granting a reward to the agent 5. More specifically, the agent 5 performs learning so as to maximize the reward.

Agent

The agents 5 are set in the multi-agent environment (Environment). The agent 5 has a learning unit (processing unit, reward acquisition unit) 10, a sensor 11, and an execution unit 12. The sensor 11 functions as a state acquisition unit to acquire the state of the agent 5. The sensor 11 is connected to the learning unit 10 and outputs the acquired state to the learning unit 10. Examples of the sensor 11 include a speed sensor, an acceleration sensor, and the like.

The learning unit 10 functions as a reward acquisition unit that acquires a reward input from the reward granting unit 6. The learning unit 10 also receives a state from the sensor 11. The learning unit 10 functions as a processing unit that selects an action based on the state and the reward using a decision-making model. Moreover, the learning unit 10 performs learning of the decision-making model so that the reward is optimized in reinforcement learning. The learning unit 10 is connected to the execution unit 12, and outputs the action selected using the decision-making model to the execution unit 12. The execution unit 12 executes the action input from the learning unit 10. Examples of the execution unit 12 include an actuator.

The agent 5 acquires the state and the reward during reinforcement learning and then selects an action from the decision-making model based on the acquired state and reward at the learning unit 10. Then, the agent 5 executes the selected action. The decision-making model (learning unit 10) of the agent 5 is mounted on a real mobile body after accomplishment of reinforcement learning, thereby implementing the cooperative action.

Reward Granting Unit

The reward granting unit 6 calculates the reward to be granted to the agent 5 based on the multi-agent environment and grants the calculated reward to the agent 5. The reward granting unit 6 calculates the reward, based on evaluation made in the presence of the target agent 5 to which the reward is to be granted and on evaluation made in the absence of the target agent 5. Specifically, the reward granting unit 6 calculates the reward based on the following Equation (1).

$$r = a + \Delta\sum_{l \neq i} v_l(a_l, s_l) - \Delta\sum_{l \neq i} v_l\left(a_l, s_l^{-i}\right) \quad (1)$$

r: reward function a: conventional reward $v_l$: agent l's value when it is observing environment state s and took action a $s_l$: environment state that agent l is observing, $s^{-i}$ represents state without agent i $a_l$: agent l's action In this equation, i represents the target agent, while I represents other agents. The reward (reward function) is given as r, while a conventional reward is given as α. Moreover, $v_l$ represents an evaluation value (the agent l's value), $s_l$ is the state of the agent l, $s^{-i}$ is the state of the agent l excluding the target agent i, and $a_l$ is the agent l's action.

In Equation (1), the second term in the right side gives an evaluation value (a first evaluation value) relating to a cooperative action of the other agents l performed in the presence of the target agent i. Specifically, the first evaluation value represents the amount of increase calculated by subtracting the sum of the evaluation values for a cooperative action before the other agents l perform actions in the presence of the target agent i from the sum of the evaluation values for the cooperative action after the other agents l perform the actions in the presence of the target agent i.

In Equation (1), the third term in the right side gives an evaluation value (a second evaluation value) for a cooperative action performed by other agents l in the absence of the target agent i. Specifically, the second evaluation value represents the amount of increase calculated by subtracting the sum of the evaluation values for a cooperative action before the other agents l perform actions in the absence of the target agent i from the sum of the evaluation values for the cooperative action after the other agents l perform the actions in the absence of the target agent i.

In Equation (1), the value given by subtracting the third term from the second term of the right side, in other words, the difference between the first and the second evaluation values, represents a penalty. The reward to be granted to the target agent i is calculated including this penalty.

Referring to FIG. 3, the second and the third terms of the right side in Equation (1), or the penalty, will be explained.

In the second term of the right side in Equation (1), the agents 5 are, for example, Agents A to D illustrated in FIG. 3. In this example, Agent A is the target agent i while Agents B to D are the other agents l. A cooperative action is, for example, an action in which Agents A to D move side-by-side at the same speed. In this case, the speed as the state of the target agent i is "2", while the speed as the state of the other agents l is "1". In this case, example actions selected by the decision-making model for Agents B to D, namely, the other agents l, for a cooperative action are that Agent B and Agent C increase the speed to "2" with Agent D maintaining the speed at "1".

Of the evaluation values obtained after completion of the actions by the other agents l in the presence of the target agent i, the maximum evaluation value is the largest speed "2" while the minimum evaluation value is the smallest speed "1". On the other hand, of the evaluation values obtained before the other agents l perform actions in the presence of the target agent i, the maximum evaluation value is the largest speed "1" while the minimum evaluation value is the smallest speed "1". The amount of increase as the first evaluation value given by the second term in the right side is therefore "−{(2−1)−(1−1)}=−1".

Concerning the third term in the right side of Equation (1), since the other agents l are moving side-by-side at the same speed in the absence of the target agent i, the actions selected by the decision-making model are such that Agents B to D as the other agents l maintain the speed at "1".

In this case, of the evaluation values obtained after completion of the actions by the other agents l in the absence of the target agent i, the maximum evaluation value is the largest speed "1" while the minimum evaluation value is the smallest speed "1". Likewise, of the evaluation values obtained before the other agents l perform the actions in the absence of the target agent i, the maximum evaluation value is the largest speed "1" while the minimum evaluation value is the smallest speed "1". The amount of increase as the second evaluation value given by the third term in the right side is therefore "−{(1−1)−(1−1)}=0".

The penalty given by subtracting the second evaluation value from the first evaluation value is "−1−0=−1". The reward of the target agent i is thus "r=α−1" by assigning the penalty "−1".

Calculation of a reward granted by the reward granting unit 6 will be explained with reference to FIG. 2. In calculation of a reward based on Equation (1), the reward granting unit 6 calculates the first evaluation value using the second term in the right side of Equation (1) (Step S1: a first step). The reward granting unit 6 then calculates the second evaluation value using the third term in the right side of Equation (1) (Step S2: a second step). The reward granting unit 6 then calculates a reward from Equation (1), assigning the preset conventional reward α, the first evaluation value, and the second evaluation value (Step S3: a third step).

Next, reinforcement learning by the agents 5 based on the reward calculated by the reward granting unit 6 will now be explained with reference to FIG. 4. As illustrated in FIG. 4, the learning system 1 acquires the state of each agent 5 present in the multi-agent environment from the sensor 11 of the agent 5 (step S11*a*). The learning system 1 also acquires the reward calculated by the method of calculation in FIG. 2 from the reward granting unit 6 (Step S12*a*). In other words, the learning system 1 collects observation information that includes the state and reward (collect Observation).

In the learning system 1, based on the acquired state and reward, each agent 5 selects an action using the decision-making model and performs the action (Step S13*a*). This process updates the multi-agent environment after completion of the actions (Step S14*a*).

By repeating the processing of Step S11 to Step S14, the learning system 1 is optimized so that the decision-making model of each agent 5 selects an action that maximizes the reward. In this manner, the learning system 1 performs reinforcement learning of the agents 5 by executing a learning program to perform the steps of FIG. 2 and FIG. 4.

Second Embodiment

Figure 5:
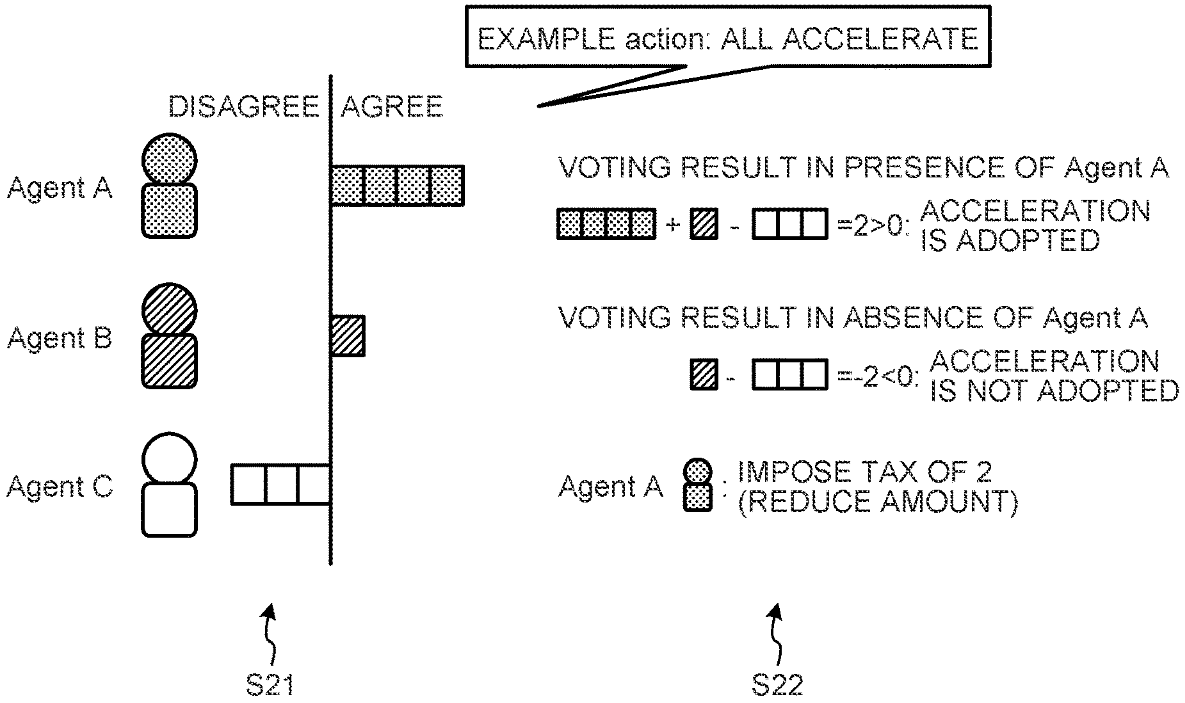
FIG. 5 is an illustrative drawing relating to learning of a learning system according to a second embodiment.

The learning system 1 of a second embodiment will now be described with reference to FIG. 5. In the second embodiment, parts different from the first embodiment will be described so as to avoid repeated description. Other parts having the same configuration as that of the first embodiment will be indicated by the same reference numerals. FIG. 5 is an illustrative drawing relating to learning of the learning system of the second embodiment.

The learning system 1 of the second embodiment imposes a tax, instead of applying the penalty that is used by the reward granting unit 6 of the first embodiment for calculation of the reward. As illustrated in FIG. 5, Agents A to C are set as the agents 5. Agent A is the target agent i while Agents B and C are the other agents l. For example, the cooperative action of this case is acceleration by all Agents A to C.

In calculation of the reward, the reward granting unit 6 causes the agents 5 to perform weighted voting to determine whether to perform the cooperative action (Step S21: a fourth step). As illustrated in FIG. 5, the weighted voting is voting to agree or disagree with execution of the cooperative action, and weight is imposed on the opinions of agree and disagree. For example, Agent A agrees, and the weight is "4". Agent B agrees, and the weight is "1". Agent C disagrees, and the weight is "3".

After completion of Step S21, if the result of voting obtained in the absence of the target agent i overturns the result of voting in the presence of the target agent i, the reward granting unit 6 reduces the reward to be granted to the target agent i by the amount of reward determined based on the result of voting in the absence of the target agent i (Step S22: a fifth step). More specifically, at Step S22, the voting result in the presence of Agent A as the target agent i is "2", which means that acceleration has been adopted. On the other hand, the voting result "2" in the absence of Agent A as the target agent i means that acceleration has not been adopted. In this case, since the voting result is overturned, the reward granting unit 6 reduces the reward by the amount of reward determined based on the voting result "−2". In other words, the reward granting unit 6 imposes a tax of "2" on the reward, whereby the reward is given as "$r=\alpha-2$". In this manner, the learning system 1 performs reinforcement learning of the agents 5 by executing a learning program to perform the steps of FIG. 5.

In the second embodiment, although tax is used instead of the penalty of the first embodiment, both the penalty and the tax may be used for calculation of the reward. In other words, the reward may be calculated using a combination of the first and the second embodiments.

As described above, the learning system 1, the learning method, and the learning program of the embodiments are comprehended as below.

A learning system 1 according to a first aspect is a learning system to carry out reinforcement learning of a cooperative action by a plurality of agents 5 in a multi-agent system that coordinates cooperative action of the agents 5. The system includes the agents 5 and a reward granting unit 6 to grant a reward to the agents 5. Each of the agents 5 includes a state acquisition unit (sensor) 11 that acquires the state of the agent 5, a reward acquisition unit (learning unit) 10 that acquires the reward from the reward granting unit 6, a processing unit (learning unit) 10 that selects an action based on the state and the reward using a decision-making model for selecting the action, and an execution unit 12 that executes the action selected by the processing unit 10. The reward granting unit 6 performs a first step (Step S1) of, in the presence of a target agent i to which the reward is to be granted, calculating an evaluation value relating to the cooperative action of other agents l as a first evaluation value, a second step (Step S2) of, in the absence of the target agent i, calculating an evaluation value relating to the cooperative action of the other agents l as a second evaluation value, and a third step (Step S3) of calculating the difference between the first evaluation value and the second evaluation value as a penalty of the target agent i and then calculating the reward to be granted to the target agent i based on the penalty. The target agent i performs learning of the decision-making model based on the reward granted by the reward granting unit 6.

A learning method according to a sixth aspect is a method of learning to carry out reinforcement learning of a cooperative action by a plurality of agents 5 in a multi-agent system that coordinates the cooperative action of the agents 5. Each of the agents 5 includes a state acquisition unit (sensor) 11 that acquires the state of the agent 5, a reward acquisition unit (learning unit) 10 that acquires the reward from the reward granting unit 6, a processing unit (learning unit) 10 that selects an action based on the state and the reward using a decision-making model for selecting the action, and an execution unit 12 that executes the action selected by the processing unit 10. The method includes a first step (Step S1) to calculate an evaluation value relating to a cooperative action of other agents l in the presence of a target agent i configured to receive the reward as a first evaluation value, a second step (Step S2) to calculate an evaluation value relating to the cooperative action of the other agents l in the absence of the target agent i as a second evaluation value, and a third step (Step S3) to calculate the difference between the first evaluation value and the second evaluation value as a penalty of the target agent i and then calculate the reward to be granted to the target agent i based on the penalty, and a step (Step S13) to carry out learning of the decision-making model of the target agent i based on the reward granted by the reward granting unit 6.

A learning program according to an eighth aspect is a learning program to carry out reinforcement learning of a cooperative action by a plurality of agents 5 in a multi-agent system that coordinates the cooperative action of the agents 5. Each of the agents 5 includes a state acquisition unit (sensor) 11 that acquires the state of the agent 5, a reward acquisition unit (learning unit) 10 that acquires the reward from the reward granting unit 6, a processing unit (learning unit) 10 that selects an action based on the state and the reward using a decision-making model for selecting the action, and an execution unit 12 that executes the action selected by the processing unit 10. The program causes the reward granting unit 6 that grants a reward to the agents 5 to execute a first step (Step S1) to calculate an evaluation value relating to the cooperative action of other agents l in the presence of a target agent i configured to receive the reward as a first evaluation value, a second step (Step S2) to calculate an evaluation value relating to the cooperative action of the other agents l in the absence of the target agent i as a second evaluation value, and a third step (Step S3) to calculate the difference between the first evaluation value and the second evaluation value as a penalty of the target agent i and then calculate the reward to be granted to the target agent i based on the penalty, and causes the target agent i to carry out learning of the decision-making model of the target agent i based on the reward granted from the reward granting unit 6.

This configuration enables the reward granting unit 6 to calculate the reward based on the fee of nuisance given to the other agents l by the target agent i. This configuration therefore prevents such an action that increases the reward of only the target agent i when the agents 5 perform a cooperative action, thereby granting a reward allowing appropriate learning of a multi-agents' cooperative action.

According to a second aspect, the first evaluation value corresponds to the amount of increase (the second term in the right side of Equation (1)) given by subtracting the sum of evaluation values relating to the cooperative action before the other agents l perform actions in the presence of the target agent i from the sum of evaluation values relating to the cooperative action after the other agents l perform the actions in the presence of the target agent i, and the second evaluation value corresponds to the amount of increase (the third term in the right side of Equation (1)) given by subtracting the sum of evaluation values relating to the cooperative action before the other agents l perform actions in the absence of the target agent i from the sum of evaluation values relating to the cooperative action after the other agents l perform the actions in the absence of the target agent i.

This configuration allows calculation of the penalty based on the amount of increase obtained by comparing values before and after the action of the agents 5. This therefore enables calculation of the penalty based on a change over time in the multi-agent environment.

According to a third aspect, the reward granting unit 6 performs a fourth step (Step S21) of causing the agents 5 to perform weighted voting relating to whether to perform the cooperative action, and a fifth step (Step S22) of, when the result of voting obtained in the absence of the target agent i overturns the result of voting in the presence of the target agent i, reducing the reward (taxation) to be granted to the target agent i by the amount of reward determined based on the result of voting in the absence of the target agent i.

This configuration allows the reward granting unit 6 to calculate a reward including a tax determined depending on the magnitude of the impact given to the other agents l by the target agent i. This configuration therefore allows the target agent i to perform an action while taking tax into consideration when the agents 5 perform a cooperative action, thereby granting a reward allowing appropriate learning of a multi-agents' cooperative action.

A learning system 1 according to a fourth aspect is a learning system to carry out reinforcement learning of a cooperative action by a plurality of agents 5 in a multi-agent system that coordinates a cooperative action of the agents 5. The learning system 1 includes the agents 5 and a reward granting unit 6 to grant a reward to the agents 5. Each of the agents 5 includes a state acquisition unit (sensor) 11 that acquires the state of the agent 5, a reward acquisition unit (learning unit) 10 that acquires the reward from the reward granting unit 6, a processing unit (learning unit) 10 that selects an action based on the state and the reward using a decision-making model for selecting the action, and an execution unit 12 that executes the action selected by the processing unit 10. The reward granting unit 6 performs a fourth step (Step S21) to cause the agents 5 to perform weighted voting relating to whether to perform a cooperative action, and a fifth step (Step S22) to, if the result of voting obtained in the absence of the target agent i overturns the result of voting in the presence of the target agent i, reduce the reward (taxation) to be granted to the target agent i by the amount of reward determined based on the result of voting in the absence of the target agent i. The target agent i performs learning of the decision-making model based on the reward granted from the reward granting unit 6.

A learning method according to a seventh aspect is a learning method to carry out reinforcement learning of a cooperative action by a plurality of agents 5 in a multi-agent system that coordinates the cooperative action of the agents 5. Each of the agents 5 includes a state acquisition unit (sensor) 11 that acquires the state of the agent 5, a reward acquisition unit (learning unit) 10 that acquires the reward from the reward granting unit 6, a processing unit (learning unit) 10 that selects an action based on the state and the reward using a decision-making model for selecting the action, and an execution unit 12 that executes the action selected by the processing unit 10. The method includes a fourth step (Step S21) to cause the agents 5 to perform weighted voting relating to whether to perform a cooperative action, and a fifth step (Step S22) to, if the result of voting obtained in the absence of the target agent i overturns the result of voting in the presence of the target agent i, reduce the reward (taxation) to be granted to the target agent i by the amount of reward determined based on the result of voting in the absence of the target agent i, and a step (Step S13) to carry out learning of the decision-making model of the target agent i based on the reward granted from the reward granting unit 6.

A learning program according to a ninth aspect is a learning program to carry out reinforcement learning of a cooperative action by a plurality of agents 5 in a multi-agent system that coordinates the cooperative action of the agents 5. Each of the agents 5 includes a state acquisition unit (sensor) 11 that acquires the state of the agent 5, a reward acquisition unit (learning unit) 10 that acquires the reward from the reward granting unit 6, a processing unit (learning unit) 10 that selects an action based on the state and the reward using a decision-making model that selects the action, and the execution unit 12 that executes the action selected by the processing unit 10. The program causes the reward granting unit 6 that grants a reward to the agents 5 to perform a fourth step (Step S21) to make the agents 5 perform weighted voting relating to whether to perform a cooperative action, and a fifth step (Step S22) to, if the result of voting obtained in the absence of the target agent i overturns the result of voting in the presence of the target agent i, reduce the reward (taxation) to be granted to the target agent i by the amount of reward determined based on the result of voting in the absence of the target agent i, and causes the target agent i to carry out learning of the decision-making model of the target agent i based on the reward granted from the reward granting unit 6.

According to the above configurations, the reward granting unit 6 can calculate a reward that includes a tax determined depending on the impact given by the target agent i to the other agents l. These configurations therefore allow the target agent i to perform an action while taking tax into consideration when the agents 5 perform a cooperative action, thereby granting a reward allowing appropriate learning of a multi-agents' cooperative action.

As a fifth aspect, the agent is a mobile body.

This configuration allows a reward to be granted such that a cooperative action by the mobile bodies can be appropriately learned.

REFERENCE SIGNS LIST

1 Learning System
5 Agent
6 Reward Granting Unit
10 Learning Unit
11 Sensor
12 Execution Unit

The invention claimed is:

1. A learning system for performing reinforcement learning of a cooperative action by a plurality of agents under a multi-agent system in which the plurality of agents perform the cooperative action, the learning system, that is implemented by a computer, comprising:

the plurality of agents; and a non-transitory memory configured to store a program;

a processor configured to execute the program stored on the memory to cause the learning system to:

grant a reward to the plurality of agents, wherein each of the agents includes a second non-transitory memory configured to store a program;

a second processor configured to execute the program stored on the memory to cause the learning system to:

acquire a state of an agent;

acquire the reward;

select an action based on the state and the reward by using a decision-making model for selecting the action; and execute the action selected, the processor is further configured to execute the program stored on the memory to cause the learning system to perform in the presence of a target agent to which the reward is to be granted, calculating an evaluation value relating to a cooperative action of other agents as a first evaluation value;

in the absence of the target agent, calculating an evaluation value relating to a cooperative action of the other agents as a second evaluation value;

calculating a difference between the first evaluation value and the second evaluation value as a penalty of the target agent and calculating the reward to be granted to the target agent in such a way as to prevent only the reward granted to the target agent from increasing based on the penalty, causing the plurality of agents to perform weighted voting relating to whether to perform a cooperative action; and when a result of voting obtained in the absence of the target agent overturns, in a manner attributable to statistical analysis of voting among agents, a result of voting in the presence of the target agent, reducing a reward to be granted to the target agent by an amount of reward, which is a tax depending on a magnitude of an impact given to the other agents by the target agent, determined based on the result of voting in the absence of the target agent, the target agent performs learning of the decision-making model based on the reward granted, wherein the target agent and the other agents are a mobile body, the decision-making model of the target agent and the other agents is mounted on a real mobile body after accomplishment of the reinforcement learning, thereby implementing the cooperative action.

2. The learning system according to claim 1, wherein the first evaluation value corresponds to an amount of increase given by subtracting the sum of evaluation values relating to a cooperative action before the other agents perform an action in the presence of the target agent from the sum of evaluation values relating to a cooperative action after the other agents perform the action in the presence of the target agent, and the second evaluation value corresponds to an amount of increase given by subtracting the sum of evaluation values relating to a cooperative action before the other agents perform actions in the absence of the target agent from the sum of evaluation values relating to a cooperative action after the other agents perform the actions in the absence of the target agent.

3. A learning method, that is implemented by a computer, for performing reinforcement learning of a cooperative action by a plurality of agents under a multi-agent system in which the plurality of agents perform the cooperative action, each of the agents including a non-transitory memory configured to store a program;

a processor configured to execute the program stored on the memory to cause the multi-agent system to:

acquire a state of an agent;

acquire a reward from a reward granting unit configured to grant the reward;

select an action based on the state and the reward by using a decision-making model for selecting the action; and execute the action selected by the processing unit, the learning method comprising:

in the presence of a target agent to which the reward is to be granted, calculating an evaluation value relating to a cooperative action of other agents as a first evaluation value;

in the absence of the target agent, calculating an evaluation value relating to a cooperative action of the other agents as a second evaluation value;

calculating a difference between the first evaluation value and the second evaluation value as a penalty of the target agent and calculating the reward to be granted to the target agent in such a way as to prevent only the reward granted to the target agent from increasing based on the penalty;

causing the plurality of agents to perform weighted voting relating to whether to perform a cooperative action; and when a result of voting obtained in the absence of the target agent overturns, in a manner attributable to statistical analysis of voting among agents, a result of voting in the presence of the target agent, reducing a reward to be granted to the target agent by an amount of reward, which is a tax depending on a magnitude of an impact given to the other agents by the target agent, determined based on the result of voting in the absence of the target agent, performing learning of the decision-making model of the target agent based on the reward granted, wherein the target agent and the other agents are a mobile body, the decision-making model of the target agent and the other agents are mounted on a real mobile body after accomplishment of the reinforcement learning, thereby implementing the cooperative action.

* * * * *